US008243392B2

(12) United States Patent
Wakahara (10) Patent No.: US 8,243,392 B2
(45) Date of Patent: Aug. 14, 2012

(54) MAGNETIC HEAD SLIDER LOCKING APPARATUS

(75) Inventor: Masahito Wakahara, Kyoto-fu (JP)

(73) Assignee: Suncall Corporation, Kyoto-Fu (JP)

( * ) Notice: Subject to any disclaimer, the term of this patent is extended or adjusted under 35 U.S.C. 154(b) by 171 days.

(21) Appl. No.: 12/833,537

(22) Filed: Jul. 9, 2010

(65) Prior Publication Data

US 2011/0007424 A1    Jan. 13, 2011

(30) Foreign Application Priority Data

Jul. 10, 2009    (JP) .................................. 2009-163286

(51) Int. Cl.
    *G11B 5/48*    (2006.01)
(52) U.S. Cl. ...................................................... 360/245
(58) Field of Classification Search .................. 360/245, 360/256.5, 245.2
    See application file for complete search history.

(56) References Cited

U.S. PATENT DOCUMENTS

| 6,549,375 | B1 * | 4/2003 | Crane et al. ................ 360/245.3 |
| 7,016,267 | B2 | 3/2006 | Suzuki |
| 7,889,460 | B2 * | 2/2011 | Hanya et al. ............... 360/245.3 |
| 2006/0236527 | A1 * | 10/2006 | Davis et al. ................ 29/603.12 |
| 2007/0263325 | A1 * | 11/2007 | Hanya et al. ............... 360/245.3 |
| 2011/0205670 | A1 | 8/2011 | Wakahara |
| 2011/0267719 | A1 | 11/2011 | Wakahara |

FOREIGN PATENT DOCUMENTS

| JP | 2005322377 A * | 11/2005 |
| JP | 2007-305209 | 11/2007 |
| JP | 2009-252261 | 10/2009 |

* cited by examiner

*Primary Examiner* — David D Davis
(74) *Attorney, Agent, or Firm* — Sterne, Kessler, Goldstein & Fox PLLC (57) ABSTRACT

A magnetic head slider locking apparatus includes a fixed portion having a distal-side engage portion engaged with a slider's distal end and fixed to a flexure part, an endless spring portion surrounding the fixed portion in a plan view, a connection portion connecting the fixed portion to the spring portion, and a proximal-side engage portion provided to the spring portion so as to be engaged with a slider's proximal end. The spring portion takes an initial posture where no external operational force is applied thereto so that the proximal-side engage portion is located closer to a distal end side in the suspension longitudinal direction than the slider's proximal end, and also takes an elastically deformed posture where an external operational force is applied thereto so that the proximal-side engage portion is located closer to a proximal end side in the suspension longitudinal direction than the slider's proximal end.

6 Claims, 8 Drawing Sheets

MAGNETIC HEAD SLIDER LOCKING APPARATUS

BACKGROUND OF THE INVENTION

1. Field of the Invention

The present invention relates to a magnetic head slider locking apparatus for detachably mounting a magnetic head slider, which reads and/or writes data from and to a recording medium such as a hard disk drive, to a magnetic head suspension.

2. Related Art

It is preferable to conduct performance tests on reading properties and/or writing properties as well as levitation properties of a magnetic head slider for reading and/or writing data in accordance with a state of use of the magnetic head slider, that is, in a state where the magnetic head slider is mounted to a magnetic head suspension having a configuration identical with that of a magnetic head suspension to be mounted thereto.

More specifically, an ordinary magnetic head suspension includes a supporting part that is connected directly or indirectly to an actuator such as a voice coil motor, a load bending part that is connected to the supporting part and generates a load to press a magnetic head slider toward a disk surface, a load beam part that is connected to the load bending part so as to transmit the load to the magnetic head slider, and a flexure part that has a head mount region to which the magnetic head slider is mounted and is supported by the load beam part and the supporting part.

Accordingly, in order to conduct performance tests of the magnetic head suspension in a state corresponding to the used condition thereof, it is necessary to conduct the performance tests in a state where the magnetic head slider is fixed to the head mount region by welding or the like.

However, upon conducting the performance tests in the state where the magnetic head slider is fixed to the head mount region, if the results of the tests on the magnetic head slider are defective, it is necessary to discard not only the magnetic head slider but also the magnetic head suspension to which the magnetic head slider has been fixed, resulting in an increase in cost.

In view of the above, there has been proposed a slider support device for performance tests, which is capable of detachably retaining the magnetic head slider in accordance with a state of use thereof (see, for example, Japanese Unexamined Patent Publication No. 2007-305209, which is to be hereinafter referred to as the prior art document).

The slider support device is provided with, in place of the flexure part of the ordinary magnetic head suspension, a flexure part to which the magnetic head slider is detachably mounted.

More specifically, the flexure part has a load beam part overlap region that is connected to the load beam part while being overlapped therewith, paired outriggers (arm regions) that extend toward a distal end side from both ends in a suspension width direction of the load beam part overlap region, a distal-end-side connection region that extends in the suspension width direction so as to connect the distal ends of the paired outriggers, a head mount region that extends from a center in the suspension width direction of the distal-end-side connection region toward a proximal end side in a suspension longitudinal direction, paired right and left spring portions that are provided on both sides in the suspension width direction of the head mount region and extend from the distal-end-side connection region toward the proximal end side in the suspension longitudinal direction, and a proximal-end-side connection region that extends in the suspension width direction so as to connect proximal ends of the paired spring portions.

The distal-end-side connection region is provided with a first support portion that prevents the magnetic head slider mounted on the head mount region from being shifted toward the distal end side in the suspension longitudinal direction.

The paired spring portions are configured to expand and contract independently from each other.

More specifically, one of the paired spring portions is disposed between the distal-end-side connection region and the proximal-end-side connection region on one side of the head mount region in the suspension width direction. On the other hand, the other one of the paired spring portions is disposed between the distal-end-side connection region and the proximal-end-side connection region on the other side of the head mount region in the suspension width direction.

The proximal-end-side connection region is connected to the distal-end-side connection region by way of the paired spring portions so as to be movable in the suspension longitudinal direction relative to the distal-end-side connection region in a state where a center portion in the suspension width direction of an end surface of the distal end thereof serves as a second support portion capable of engaging with an end surface of the proximal end of the magnetic head suspension mounted on the head mount region.

In the slider support device, in a state where the proximal-end-side connection region is shifted to be spaced apart from the distal-end-side connection region so that the paired spring portions are elastically deformed to expand, when the magnetic head slider is mounted on the head mount region and a force applied onto the proximal-end-side connection region is then canceled, the paired spring portions are contracted so that the magnetic head slider is retained between the first and second support portions.

That is, the slider support device is configured to retain the magnetic head slider on the head mount region with use of the elastic forces of the paired spring portions, without adopting substantially inseparable fixing means such as welding or adhesive joining.

The slider support device described above advantageously realizes the performance tests of the magnetic head slider in accordance with the state of use thereof, as well as enables only the defective magnetic head slider to be discarded. On the other hand, this slider support device has the following problems.

As already described, in the slider support device, the paired spring portions are disposed respectively on the one side and on the other side of the head mount region, and expand and contract independently from each other.

In other words, each of the paired spring portions has the distal end, which serves as a fixed end, connected to the distal-end-side connection region, and the proximal end, which serves as a movable end connected to the proximal-end-side connection region, so as to be supported in a cantilever manner.

It is necessary to provide each of the paired spring portions with an elastically deformable region as large as possible, in order that each of the paired spring portions being supported in a cantilever manner causes a sufficiently strong elastic force in correspondence with the shift of the proximal-end-side connection region so as to be spaced apart from the distal-end-side connection region, while securing sufficiently large expansion and contraction stroke (a range of elastic deformation).

In view of the above, the slider support device described in the prior art document includes the paired spring portions each of which has an accordion shape in a plan view such that convex portions and concave portions are arranged alternately in a plane on which the flexure part is positioned.

The paired spring portions each having such an accordion shape in a plan view secure sufficiently large expansion and contraction strokes thereof as well as increase the elastic forces caused by the paired spring portions. On the other hand, it requires high processing accuracy to form each of the paired spring portions into the accordion shape in a plan view, which results in remarkable increase in cost.

Moreover, in such a spring portion in the accordion shape in a plan view, the convex portions and the concave portions are locally and elastically deformed upon expansion and contraction of the spring portion in correspondence with the shift of the proximal-end-side connection region to contact with or separate from the distal-end-side connection region. Therefore, the spring portion in the accordion shape in a plan view may also have a problem on durability thereof.

SUMMARY OF THE INVENTION

The present invention has been achieved in view of the problems arising in the conventional art, and an object thereof is to provide a magnetic head slider locking apparatus, which detachably mounts the magnetic head slider to a magnetic head suspension with use of an elastic force caused by elastic deformation of a spring portion, wherein the magnetic head slider locking apparatus is capable of generating a sufficiently strong elastic force while the spring portion has a sufficiently large expansion and contraction stroke, as well as is capable of improving durability of the spring portion, with no need for high processing accuracy.

In order to achieve the first object, the present invention provides a magnetic head slider locking apparatus for detachably mounting a magnetic head slider to a magnetic head suspension. The magnetic head suspension includes a supporting part that is swung about a swing center directly or indirectly by an actuator, a load bending part that generates a load for pressing a magnetic head slider toward a disk surface, a load beam part that is supported by the supporting part through the load bending part and transmits the load to the magnetic head slider, and a flexure part that is supported by the load beam part. The flexure part has a flexure substrate that integrally includes a load beam part overlap region fixed to the load beam part in a state of being overlapped therewith, paired arm regions extending toward a distal end side from both ends in a suspension width direction of the load beam part overlap region, a connection region extending in the suspension width direction so as to connect distal ends of the paired arm regions, and a head mount region which extends from the connection region toward a proximal end side in the suspension longitudinal direction so as to be positioned between the paired arm regions and to which the magnetic head slider is mounted.

The magnetic head slider locking apparatus according to the present invention includes a fixed portion that is fixed to the connection region and is provided with a distal-side engage portion to be engaged with a distal end of the magnetic head slider being mounted on the head mount region, an endless spring portion that is disposed to surround the fixed portion in a plan view as viewed along a direction perpendicular to the disk surface, a connection portion that connects the fixed portion to the spring portion, and a proximal-side engage portion that is provided to the spring portion so as to be engaged with a proximal end of the magnetic head slider being mounted on the head mount region, wherein the spring portion is capable of taking an initial posture where no external operational force is applied thereto so that the proximal-side engage portion is located closer to a distal end side in the suspension longitudinal direction than the proximal end of the magnetic head slider that is mounted on the head mount region in a state of being engaged with the distal-side engage portion, and also taking an elastically deformed posture where an external operational force is applied thereto so that the proximal-side engage portion is located closer to a proximal end side in the suspension longitudinal direction than the proximal end of the magnetic head slider.

The magnetic head suspension according to the present invention makes it possible to cause a spring portion to have a sufficiently large expansion and contraction stroke upon elastic deformation of the spring portion as well as improve the elastic force caused by elastic deformation of the spring portion, with no need of forming the spring portion into a complicated shape, thereby realizing cost reduction.

Further, since the magnetic head slider locking apparatus according to the present invention is configured so that the spring portion formed into an endless shape is entirely elastically deformed to generate the elastic force, the magnetic head slider locking apparatus makes it possible to improve durability in comparison with a conventional configuration having a spring portion with an accordion shape that is locally elastically deformed to generate an elastic force.

Preferably, the magnetic head slider locking apparatus may further include paired pinching arms that are provided to the fixed portion so as to pinch both sides in the suspension width direction of the magnetic head slider that has been mounted on the head mount region in a state of being engaged with the distal-side engage portion.

The configuration makes it possible to realize stabilization of support of the magnetic head slider.

Preferably, the connection portion connects a distal end of the fixed portion to an inner peripheral surface of the spring portion at the center in the suspension width direction, and the proximal-side engage portion is disposed at the center in the suspension width direction.

The configuration makes it possible to increase as much as possible a length of a region of the spring portion that is elastically deformed, thereby effectively preventing concentration of a stress onto a specific region of the spring portion upon elastic deformation of the spring portion.

More preferably, an engagement surface of the proximal-side engage portion that is engaged with the magnetic head slider has a curved shape that is convex toward the distal end in a plan view.

The configuration makes it possible to suitably maintain an engagement between the proximal-side engage portion and the magnetic head slider, even in a case where the magnetic head slider is displaced with respect to the proximal-side engage portion.

Preferably, the spring portion in the initial posture has a substantially elliptical shape with a width length in the suspension width direction being larger than a longitudinal length in the suspension longitudinal direction, and the longitudinal length is increased while the width length is reduced as the spring portion is transformed from the initial posture into the elastically deformed posture.

The configuration makes it possible to cause the spring portion to be elastically deformed entirely and naturally upon transformation thereof between the initial posture and the elastically deformed posture, thereby effectively preventing concentration of a stress onto a specific region of the spring portion upon elastic deformation thereof to achieve improvement in durability of the spring portion.

More preferably, the substantially elliptical shape is formed by a distal-side linear section, a proximal-side linear section, a first curved section and a second curved section, wherein the distal-side linear section extends from a site connected with the connection portion toward both sides in the suspension width direction, the proximal-side linear section extends from a site provided with the proximal-side engage portion toward both sides in the suspension width direction, the first curved section connects first ends of the distal-side linear section and the proximal-side linear section and is curved outward in the suspension width direction in a plan view, and the second curved section connects second ends of the distal-side linear section and the proximal-side linear section and is curved outward in the suspension width direction in a plan view.

The configuration makes it possible to effectively prevent contact of the spring portion to the fixed portion upon elastic deformation of the spring portion, without increasing the size of the spring portion.

BRIEF DESCRIPTION OF THE DRAWINGS

FIGS. 5A to 5C are plan views of the magnetic head slider locking apparatus.

DETAILED DESCRIPTION OF THE PREFERRED EMBODIMENTS

Hereinafter, one preferred embodiment of a magnetic head slider locking apparatus according to the present invention will be described, with reference to the attached drawings.

Figure 1:
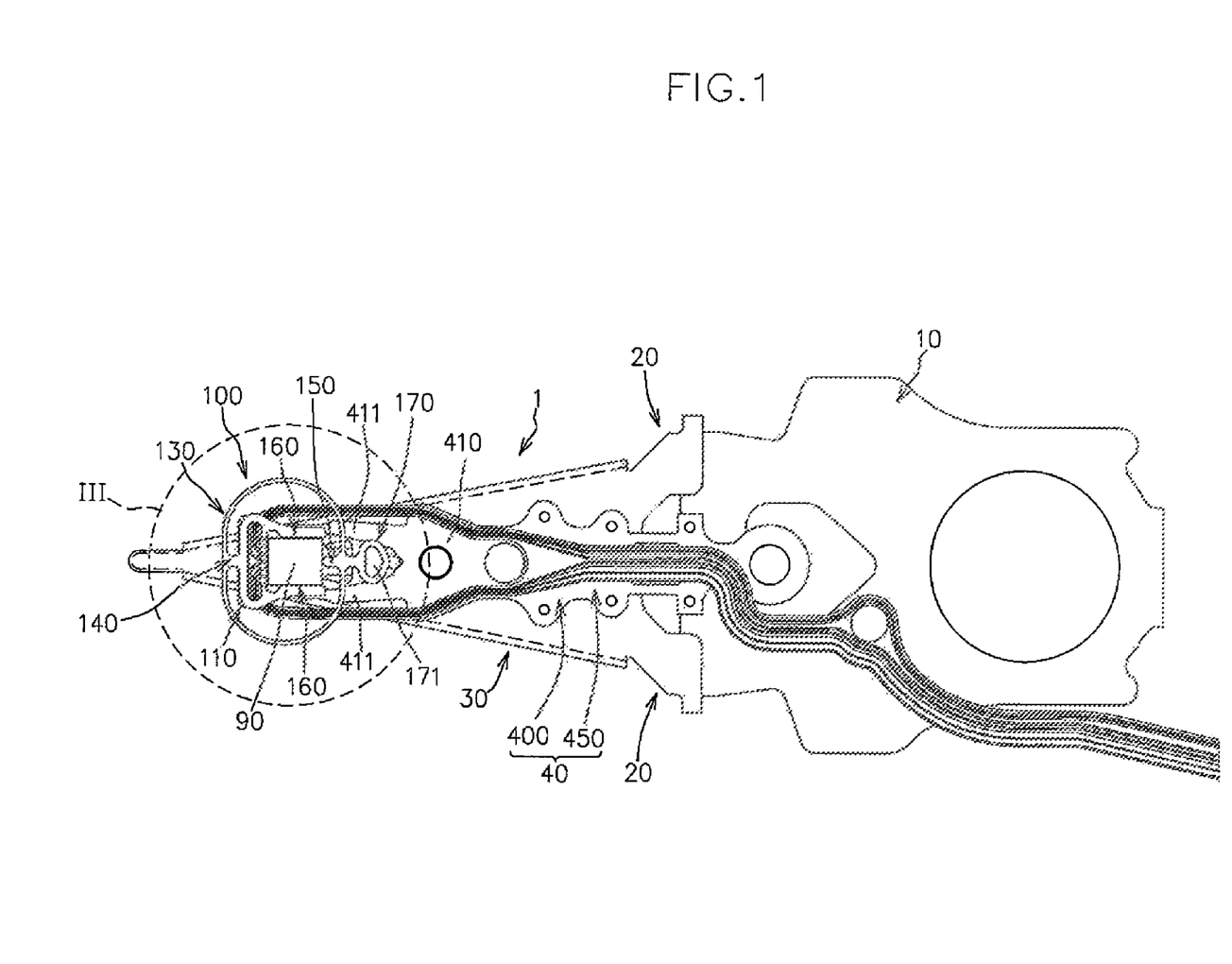
FIG. 1 is a bottom view of a magnetic head suspension with a magnetic head slider being mounted thereto with use of a magnetic head slider locking apparatus according to one embodiment of the present invention.

FIG. 1 is a bottom view (a bottom plan view as viewed from a side close to a disk surface) of a magnetic head suspension 1 to which a magnetic head slider locking apparatus 100 according to the present embodiment is mounted. FIG. 1 indicates welding points with small circles.

Figure 2:
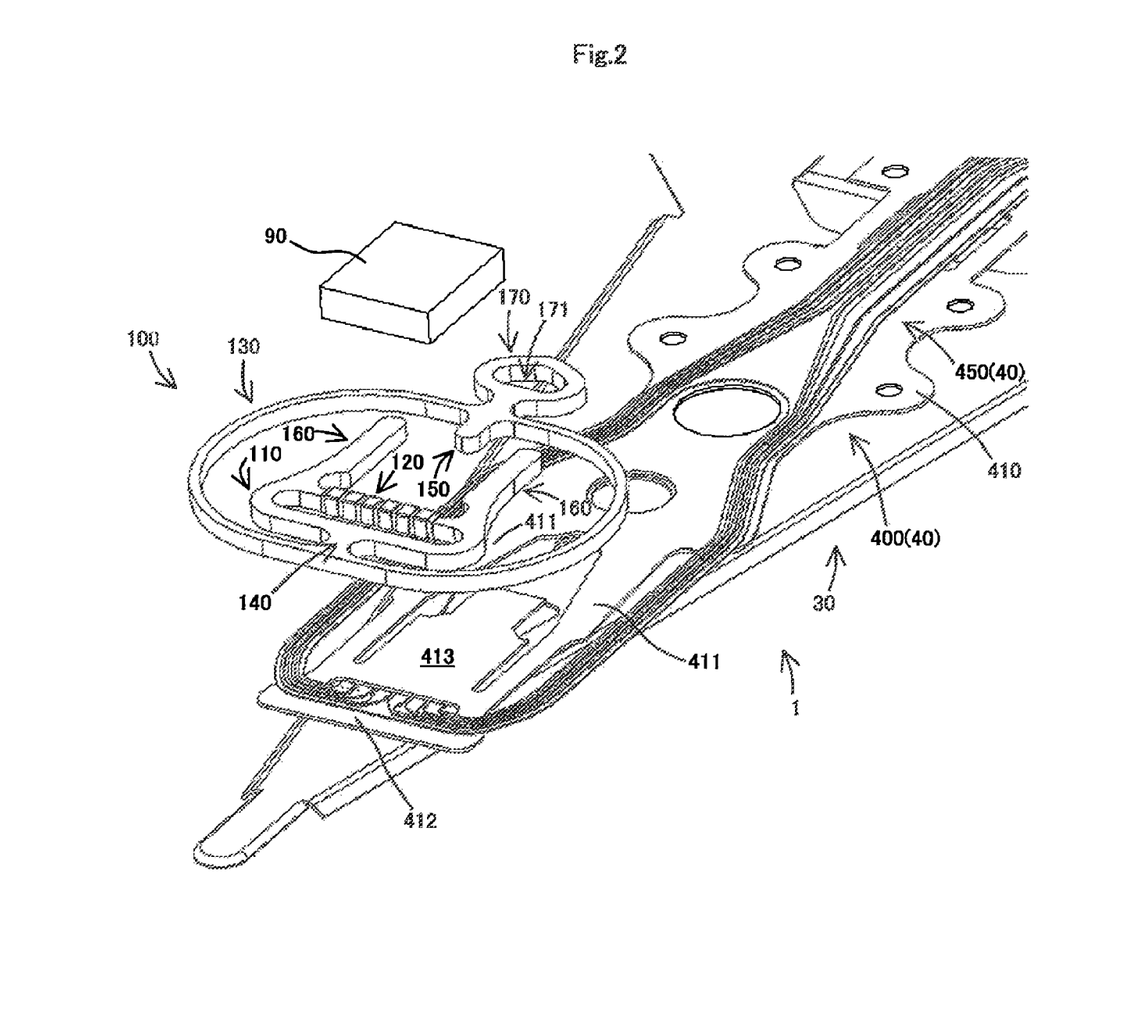
FIG. 2 is an exploded perspective view of the magnetic head suspension shown in FIG. 1

FIG. 2 is an exploded perspective view of a magnetic head slider 90, the magnetic head slider locking apparatus 100 and the magnetic head suspension 1.

The magnetic head slider locking apparatus 100 is a member for detachably mounting the magnetic head slider 90 to the magnetic head suspension 1.

More specifically, the magnetic head slider locking apparatus 100 is capable of causing the magnetic head slider 90 to be retained at the magnetic head suspension 1 so as to allow performance tests of the magnetic head slider 90 regarding reading properties and/or writing properties as well as levitation properties thereof to be conducted under a used condition where the magnetic head slider 90 is mounted to the magnetic head suspension 1, and is also capable of easily detaching the magnetic head slider 90 from the magnetic head suspension 1 when the magnetic head slider 90 is defective.

The magnetic head suspension 1 to which the magnetic head slider locking apparatus 100 is applied is firstly explained.

As shown in FIGS. 1 and 2, the magnetic head suspension 1 includes a supporting part 10 that is swung about a swing center directly or indirectly by an actuator such as a voice coil motor, a load bending part 20 that generates a load for pressing the magnetic head slider 90 toward the disk surface, a load beam part 30 that is supported by the supporting part 10 through the load bending part 20 and transmits the load to the magnetic head slider 50, and a flexure part 40 that is supported by the load beam part 30.

In the illustrated embodiment, the supporting part 10 is formed as a base plate including a boss portion to which a distal end of a carriage arm (not shown) is joined by swage processing, the carriage arm being connected to the actuator. However, it is of course possible that the supporting part 10 is formed as an arm that is directly connected to the swing center of the actuator.

As shown in FIGS. 1 and 2, the flexure part 40 includes a flexure substrate 400 fixed to the load beam part 30 and the supporting part 10, and a wiring structure 450 laminated on the flexure substrate 400.

The flexure substrate 400 includes a load beam part overlap region 410 fixed to the load beam part 30 by welding or the like in a state of being overlapped with the load beam part 30, paired arm regions 411 that extend toward a distal end side from both ends in a suspension width direction of the load beam part overlap region 410, a connection region 412 that extends in the suspension width direction so as to connect distal ends of the paired arm regions 411, and a head mount region 413 which extends from the connection region 412 toward a proximal end side in the suspension longitudinal direction so as to be positioned between the paired arm regions 411 and to which the magnetic head slider 90 is mounted.

The magnetic head slider locking apparatus 100 is capable of detachably mounting the magnetic head slider 90 on the head mount region 413.

Figure 3:
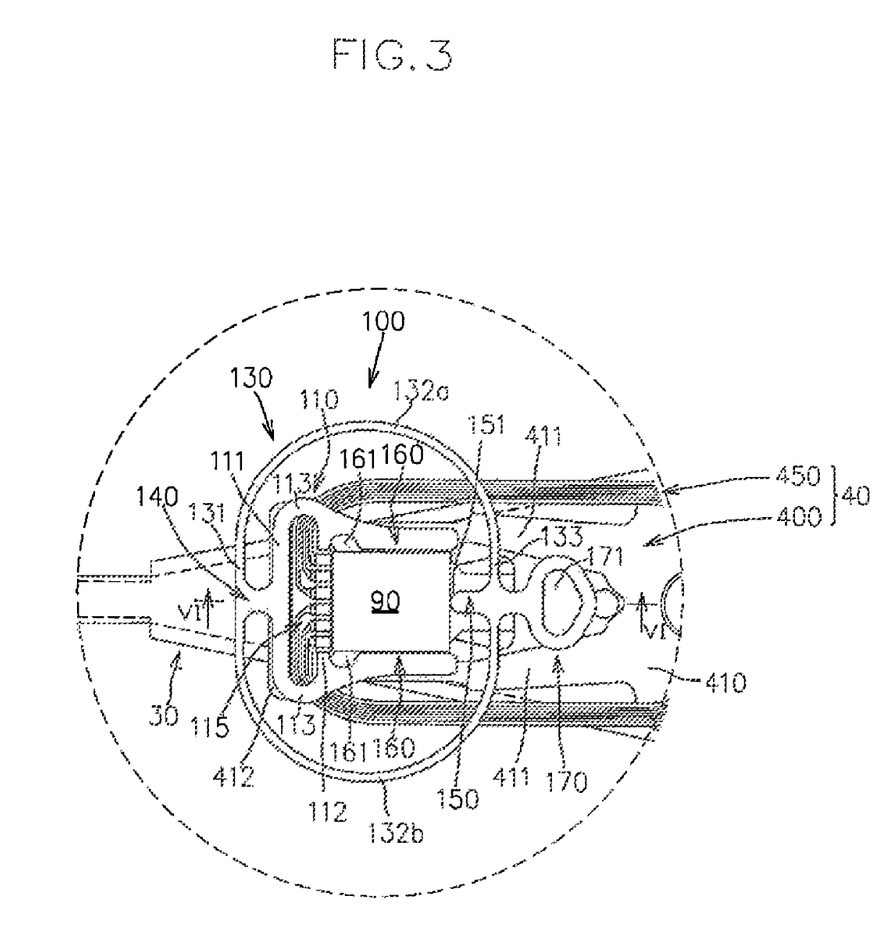
FIG. 3 is an enlarged view of III portion in FIG. 1.

FIG. 3 is an enlarged view of III portion in FIG. 1.

Figure 4:
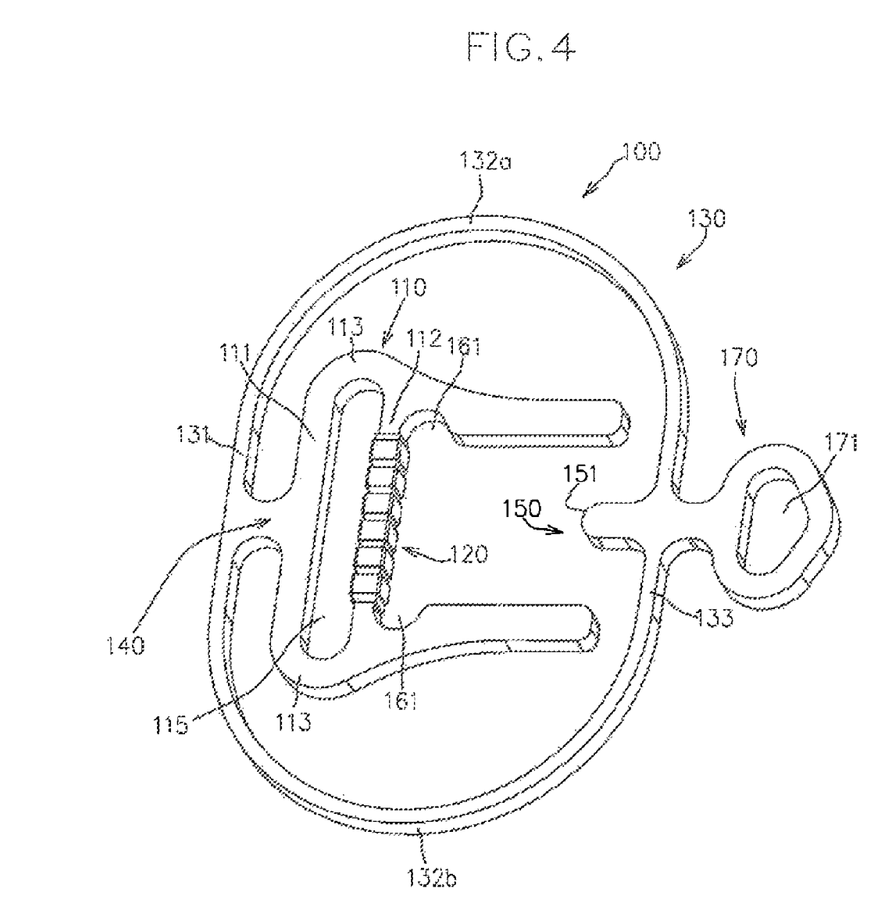
FIG. 4 is a perspective view of the magnetic head slider locking apparatus.

FIG. 4 is a perspective view of the magnetic head slider locking apparatus 100.

As shown in FIGS. 3 and 4, the magnetic head slider locking apparatus 100 includes a fixed portion 110 that is fixed to the connection region 412 with use of an adhesive agent and/or by welding and is provided with a distal-side engage portion 120 to be engaged with a distal end of the magnetic head slider 90 being mounted on the head mount region 413, an endless spring portion 130 that is disposed to surround the fixed portion 110 in a plan view as viewed along a direction perpendicular to the disk surface, a connection portion 140 that connects the fixed portion 110 to the spring portion 130, and a proximal-side engage portion 150 that is provided to the spring portion 130 so as to be engaged with a proximal end of the magnetic head slider 90 being mounted on the head mount region 413.

Figure 5A:
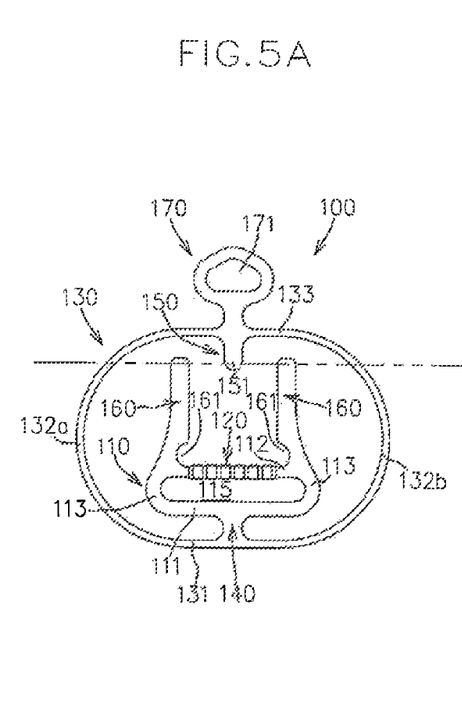
FIGS. 5A to 5C show an initial posture, an elastically deformed posture and a magnetic head slider retaining posture of the spring portion of the magnetic head slider locking apparatus, respectively.
Figure 5B:
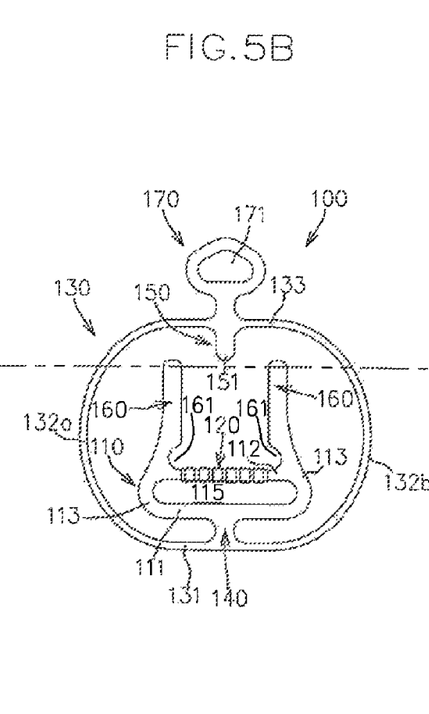
Figure 5C:
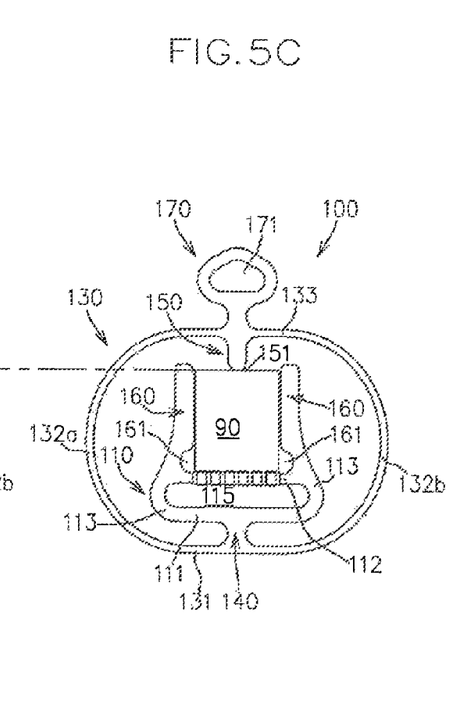

FIGS. 5A to 5C show three postures that the spring portion 130 can take. The spring portion 130 shown in FIG. 5A is in an initial posture, where no external operational force is applied thereto. The spring portion 130 shown in FIG. 5B is in an elastically deformed posture, where an external operational force is applied to the spring portion 130 so that the proximal-side engage portion 150 is spaced apart from the distal-side engage portion 120, and the spring portion 130 is elastically deformed. The spring portion 130 shown in FIG. 5C is in a magnetic head slider retaining posture, where the magnetic head slider 90 is located between the distal-side engage portion 120 and the proximal-side engage portion 150 in a state where the spring portion 130 has been in the elastically deformed posture, and then the external operational force is canceled.

In the spring portion 130 in the initial posture, the proximal-side engage portion 150 is located closer to the distal end of the suspension in the longitudinal direction with respect to the proximal end of the magnetic head slider 90 that is mounted on the head mount region 413 in a state of being engaged with the distal-side engage portion 120 (see FIG. 5A). In the spring portion 130 in the elastically deformed posture, the proximal-side engage portion 150 is located closer to the proximal side in the suspension longitudinal direction with respect to the proximal end of the magnetic head slider 90 (see FIG. 5B). Therefore, in a case where the magnetic head slider 90 is located between the distal-side engage portion 120 and the proximal-side engage portion 150 with the spring portion 130 being in the elastically deformed posture and then the external operational force is canceled, the magnetic head slider 90 is retained by the distal-side engage portion 120 and the proximal-side engage portion 150 due to the elastic force of the spring portion 130 (see FIG. 5C).

The magnetic head slider locking apparatus 100 configured as described above exerts the following effects.

As referred to in the description of the background art, there has been proposed the slider support device including, as members for detachably supporting a magnetic head slider, paired spring portions that are disposed on respective sides of the magnetic head slider in the suspension width direction and expand and contract independently from each other.

In the conventional slider support device, each of the paired spring portions has the distal end serving as the fixed end, which is connected to the distal-end-side connection region to be engaged with the distal end of the magnetic head slider and the proximal end serving as the movable end, which is connected to the proximal-end-side connection region to be engaged with the proximal end of the magnetic head slider. The spring portions 130 each expand and contract in the longitudinal direction while being supported in a cantilever manner.

It is difficult to secure elastic forces strong enough to retain the magnetic head slider with use of elastic deformation of the paired spring portions, while securing the expansion and contraction strokes of the paired spring portions that are each supported in a cantilever manner.

Accordingly, each of the paired spring portions in the conventional slider support device has the accordion shape in a plan view such that the convex portions and the concave portions are arranged alternately in the suspension longitudinal direction in the plane on which the flexure part is positioned. This configuration secures the elastic forces for retaining the magnetic head slider. However, high processing accuracy is required to form the accordion shape, which results in a remarkable increase in cost.

To the contrary, in the magnetic head slider locking apparatus 100 according to the present embodiment, as described above, the endless spring portion 130 disposed to surround the magnetic head slider 90 is elastically deformed to cause an elastic force for retaining the magnetic head slider 90.

The magnetic head slider locking apparatus 100 thus configured does not require high processing accuracy for formation of the spring portion 130, and the spring portion 130 is capable of causing a strong elastic force while securing the sufficient expansion and contraction stroke, thereby achieving a reduction in cost.

Moreover, in the conventional configuration, the convex portions and the concave portions are locally and elastically deformed upon elastic deformation of the spring portions, which may cause another problem on durability.

To the contrary, in the present embodiment, the endless spring portion 130 is entirely elastically deformed to cause the elastic force for locking the magnetic head slider 90. Therefore, durability can be significantly improved in comparison to the conventional configuration provided with the spring portions that are each in the accordion shape.

As shown in FIGS. 1 to 5C, the magnetic head slider locking apparatus 100 according to the present embodiment further includes paired pinching arms 160 that are provided to the fixed portion 110 so as to pinch the both sides in the suspension width direction of the magnetic head slider 90 that has been mounted on the head mount region 413 in a state of being engaged with the distal-side engage portion 120.

Provision of the paired pinching arms 160 enables the magnetic head slider 90 to be retained more stably.

As shown in FIGS. 3 to 5C, each of the paired pinching arms 160 is preferably provided at the proximal end thereof with a concave portion 161 that is opened inward in the suspension width direction.

Provision of the concave portions 161 facilitates elastic deformation of the paired pinching arms 160 such that free ends of the paired pinching arms 160 come close to and separate from each other.

The fixed portion 110 can be modified into various modes as far as being fixed to the flexure board 400.

As shown in FIGS. 1 to 5C, the fixed portion 110 in the present embodiment extends in the suspension width direction, and the paired pinching arms 160 extend from respective ends in the suspension width direction of the fixed portion 110 toward the proximal end in the suspension longitudinal direction.

In the configuration described above, a portion located between the paired pinching arms 160 in the proximal end surface of the fixed portion 110 serves as the distal-side engage portion 120.

As shown in FIGS. 3 to 5C, the fixed portion 110 in the present embodiment has a distal-side fixed section 111, a proximal-side fixed section 112, and paired right and left connection sections 113. The distal-side fixed section 111 extends in the suspension width direction and is connected to the spring portion 130 by way of the connection portion 140. The proximal-side fixed section 112 is located closer to the proximal end in the suspension longitudinal direction with respect to the distal-side fixed section 111 so as to allow a slit 115 to be provided between the distal-side fixed section 111 and the proximal-side fixed section 112, and extends in the suspension width direction to be connected with the paired pinching arms 160. The paired right and left connection sections 113 connect opposing ends of the distal-side fixed section 111 and the proximal-side fixed section 112, respectively.

In this configuration, the portion located between the paired pinching arms 160 in the proximal end surface of the proximal-side fixed section 112 serves as the distal-side engage portion 120.

Further, as shown in FIG. 3 and the like, the magnetic head slider locking apparatus 100 according to the present embodiment is configured so that the magnetic head slider 90 is detachably mounted to the magnetic head suspension 1, and the magnetic head slider 90 being mounted to the magnetic head suspension 1 is electrically connected to the wiring portion 450 of the flexure portion 40.

Figure 6:
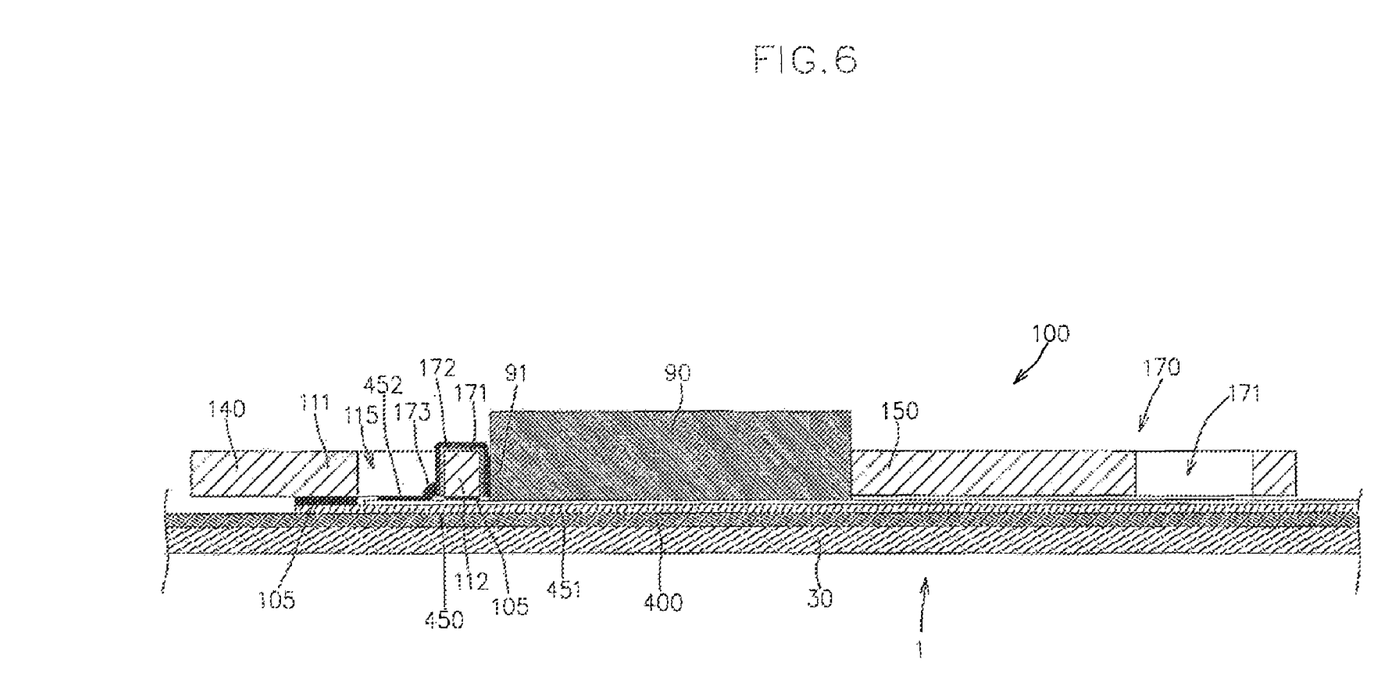
FIG. 6 is a cross sectional view taken along line VI-VI of FIG. 3.

FIG. 6 is a cross sectional view taken along line VI-VI of FIG. 3.

As described above, the flexure portion 40 includes the flexure board 400 and the wiring portion 450.

As shown in FIGS. 1, 6, and the like, the wiring portion 450 may have an insulative layer 451 laminated on the flexure board 400, a conductive layer 452 laminated on the insulative layer 451, and a protective layer (not shown) covering the conductive layer 452.

On the other hand, the magnetic head slider locking apparatus 100 has an electrical connection structure provided to the proximal-side fixed section 112.

As shown in FIG. 6, the electrical connection structure includes an insulative layer 171 that wraps the proximal-side fixed section 112, and a conductive member 172 that wraps the insulative layer 171. The conductive member 172 is electrically connected to the conductive layer 452 of the wiring portion 450 by way of a solder 173 or the like.

In this configuration, when the magnetic head slider 90 is locked to the magnetic head suspension 1 by way of the magnetic head slider locking apparatus 100, a terminal 91 of the magnetic head slider 90 is electrically connected to the conductive layer 452 by way of the conductive member 172 and the solder 173.

Reference numerals 105 in FIG. 6 denote an adhesive agent.

The slit 115 serves as an insert hole for a fixed jig 210, which is arbitrarily used to elastically deform the spring portion 130 such that the proximal-side engage portion 150 is spaced apart from the distal-side engage portion 120.

Figure 7:
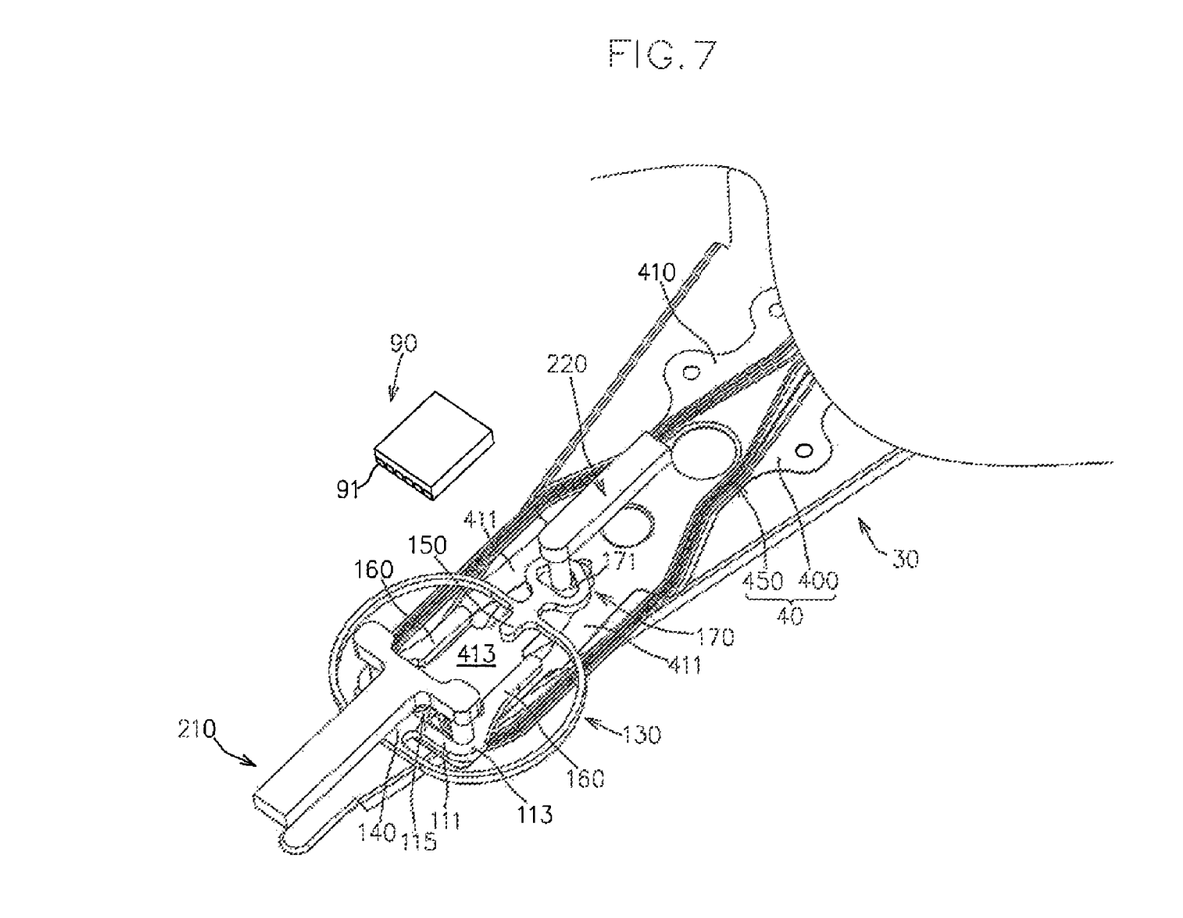
FIG. 7 is a perspective view showing a state where the magnetic head slider locking apparatus is elastically deformed.

More specifically, as shown in FIG. 7, when the spring portion 130 is elastically deformed in the state where the fixed jig 210 is inserted into the slit 115, application of an unnecessary stress to the magnetic head suspension 1 is effectively prevented upon elastic deformation of the spring portion 130.

The magnetic head slider locking apparatus 100 is preferably provided with a movable jig insert hole 171 for allowing a movable jig 220 to be inserted therein, which is arbitrarily used for elastically deforming the spring portion 130 so as to cause the proximal-side engage portion 150 to be spaced apart from the distal-side engage portion 120.

As shown in FIGS. 1 to 7, in the present embodiment, the magnetic head slider locking apparatus 100 has an extending arm 170 that is provided with the movable jig insert hole 171 and extends from the spring portion 130 toward the proximal end in the suspension longitudinal direction.

As shown in FIGS. 1 to 5C, the connection portion 140 in the present embodiment connects the distal end of the fixed portion 110 to the inner peripheral surface of the spring portion 130 at the center in the suspension width direction, and the proximal-side engage portion 150 is disposed at the center in the suspension width direction.

This configuration can increase as much as possible the length of the region in which the spring portion 130 is elastically deformed upon transformation thereof from the initial posture into the elastically deformed posture. Therefore, it is possible to effectively prevent concentration of a stress onto a specific region of the spring portion 130 upon elastic deformation of the spring portion 130.

Further, as shown in FIGS. 1 to 3, in the present embodiment, the proximal-side engage portion 150 has an engage surface 151 to be engaged with the magnetic head slider 90, and the engage surface 151 has a curved shape convex toward the distal end in a plan view.

In this configuration, even in a case where the magnetic head slider 90 is displaced with respect to the proximal-side engage portion 150, it is possible to preferably maintain the engagement between the proximal-side engage portion 150 and the magnetic head slider 90.

The endless spring portion 130 may be modified into various modes, as far as it is transformable between the initial posture and the elastically deformed posture.

As shown in FIGS. 1 to 5C, in the present embodiment, the spring portion 130 in the initial posture has a substantially elliptical shape with the length in the suspension width direction being larger than the length in the suspension longitudinal direction, and the longitudinal length is increased while the width length is reduced as the spring portion 130 is transformed from the initial posture into the elastically deformed posture.

In this configuration, the spring portion 130 is elastically deformed entirely and naturally upon transformation thereof between the initial posture and the elastically deformed posture. Therefore, it is possible to effectively prevent concentration of a stress onto a specific region of the spring portion 130 upon elastic deformation thereof, whereby achieving improvement in durability of the spring portion 130.

As shown in FIGS. 3 to 5C, the substantially elliptical shape is preferably formed by a distal-side linear section 131, a proximal-side linear section 133, a first curved section 132a, and a second curved section 132b. The distal-side linear section 131 extends from a site connected with the connection portion 140 toward both sides in the suspension width direction. The proximal-side linear section 133 extends from a site provided with the proximal-side engage portion 150 toward both sides in the suspension width direction. The first curved section 132a connects a first end of the distal-side linear section 131 and a first end of the proximal-side linear section 133, and is curved outward in the suspension width direction in a plan view. The second curved section 132b connects a second end of the distal-side linear section 131 and a second end of the proximal-side linear section 133, and is curved outward in the suspension width direction in a plan view.

In the spring portion 130 thus configured, it is possible to effectively prevent contact of the spring portion 130 to the fixed portion 110 upon elastic deformation of the spring portion 130, without increasing the size of the spring portion 130.

Figure 8A:
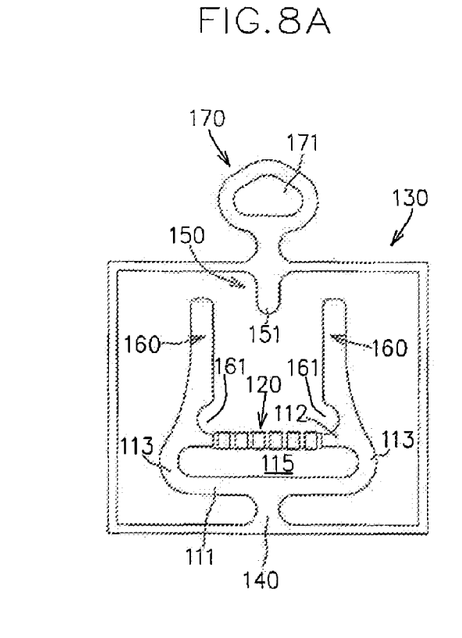
FIGS. 8A to 8C are bottom views of magnetic head suspensions according to modifications of the present invention.
Figure 8B:
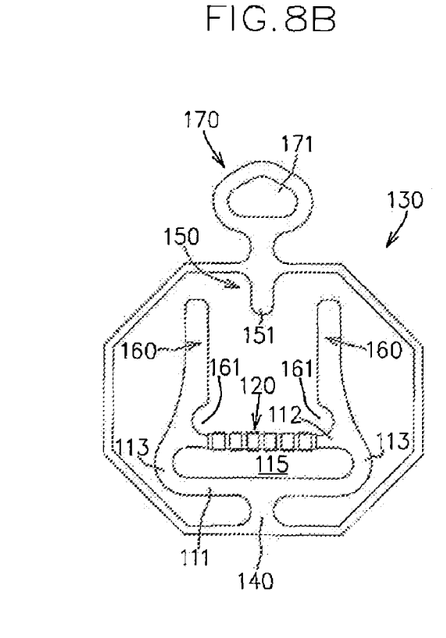
Figure 8C:
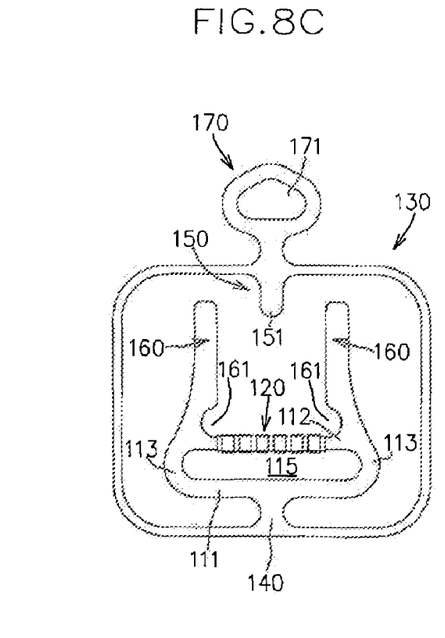

FIGS. 8A to 8C are bottom views (bottom plan views as viewed from the side close to the disk surface) of magnetic head suspensions according to modifications of the present invention.

In the drawings, the members same as those in the magnetic head slider locking apparatus 100 according to the present embodiment are denoted by the same reference numerals.

Alternatively, as shown in FIGS. 8A and 8B, the spring portion 130 can be formed in a polygonal shape. Further alternatively, as shown in FIG. 8C, the spring portion 130 can be formed in a polygonal shape with corners thereof being curved or chamfered.

What is claimed is:

1. A magnetic head slider locking apparatus for detachably mounting a magnetic head slider to a magnetic head suspension including a supporting part that is swung about a swing center directly or indirectly by an actuator, a load bending part that generates a load for pressing a magnetic head slider toward a disk surface, a load beam part that is supported by the supporting part through the load bending part and transmits the load to the magnetic head slider, and a flexure part that is supported by the load beam part, the flexure part having a flexure substrate that integrally includes a load beam part overlap region fixed to the load beam part in a state of being overlapped therewith, paired arm regions extending toward a distal end side from both ends in a suspension width direction of the load beam part overlap region, a connection region extending in the suspension width direction so as to connect distal ends of the paired arm regions, and a head mount region which extends from the connection region toward a proximal end side in the suspension longitudinal direction so as to be positioned between the paired arm regions and to which the magnetic head slider is mounted, the magnetic head slider locking apparatus comprising,     a fixed portion that is fixed to the connection region and is provided with a distal-side engage portion to be engaged with a distal end of the magnetic head slider being mounted on the head mount region, an endless spring portion that is disposed to surround the fixed portion in a plan view as viewed along a direction perpendicular to the disk surface, a connection portion that connects the fixed portion to the spring portion, and a proximal-side engage portion that is provided to the spring portion so as to be engaged with a proximal end of the magnetic head slider being mounted on the head mount region,   wherein the spring portion is capable of taking an initial posture where no external operational force is applied thereto so that the proximal-side engage portion is located closer to a distal end side in the suspension longitudinal direction than the proximal end of the magnetic head slider that is mounted on the head mount region in a state of being engaged with the distal-side engage portion, and also taking an elastically deformed posture where an external operational force is applied thereto so that the proximal-side engage portion is located closer to a proximal end side in the suspension longitudinal direction than the proximal end of the magnetic head slider.

2. A magnetic head slider locking apparatus according to claim 1, further comprising paired pinching arms that are provided to the fixed portion so as to pinch both sides in the suspension width direction of the magnetic head slider that has been mounted on the head mount region in a state of being engaged with the distal-side engage portion.

3. A magnetic head slider locking apparatus according to claim 1, wherein the connection portion connects a distal end of the fixed portion to an inner peripheral surface of the spring portion at the center in the suspension width direction, and the proximal-side engage portion is disposed at the center in the suspension width direction.

4. A magnetic head slider locking apparatus according to claim 3, wherein an engagement surface of the proximal-side engage portion that is engaged with the magnetic head slider has a curved shape that is convex toward the distal end in a plan view.

5. A magnetic head slider locking apparatus according to claim 3, wherein the spring portion in the initial posture has a substantially elliptical shape with a width length in the suspension width direction being larger than a longitudinal length in the suspension longitudinal direction, and the longitudinal length is increased while the width length is reduced as the spring portion is transformed from the initial posture into the elastically deformed posture.

6. A magnetic head slider locking apparatus according to claim 5, wherein the substantially elliptical shape is formed by a distal-side linear section, a proximal-side linear section, a first curved section and a second curved section, wherein the distal-side linear section extends from a site connected with the connection portion toward both sides in the suspension width direction, the proximal-side linear section extends from a site provided with the proximal-side engage portion toward both sides in the suspension width direction, the first curved section connects first ends of the distal-side linear section and the proximal-side linear section and is curved outward in the suspension width direction in a plan view, and the second curved section connects second ends of the distal-side linear section and the proximal-side linear section and is curved outward in the suspension width direction in a plan view.

\* \* \* \* \*